United States Patent Office

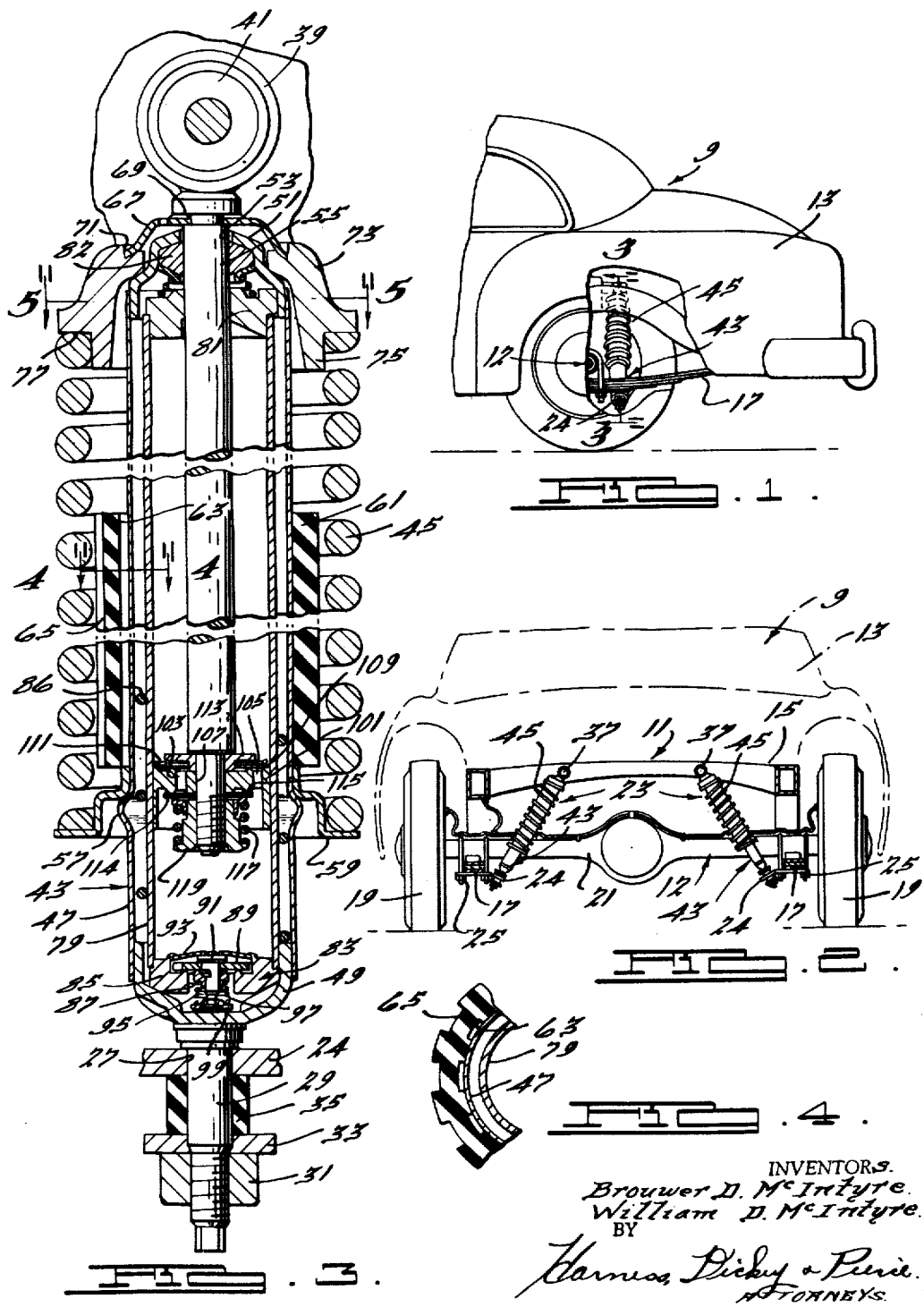

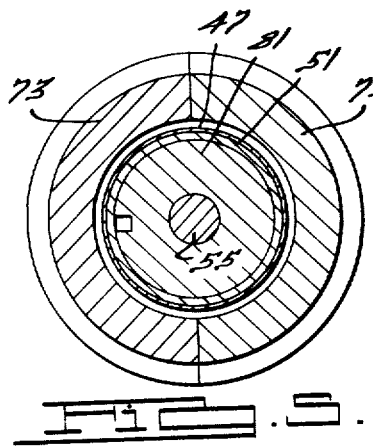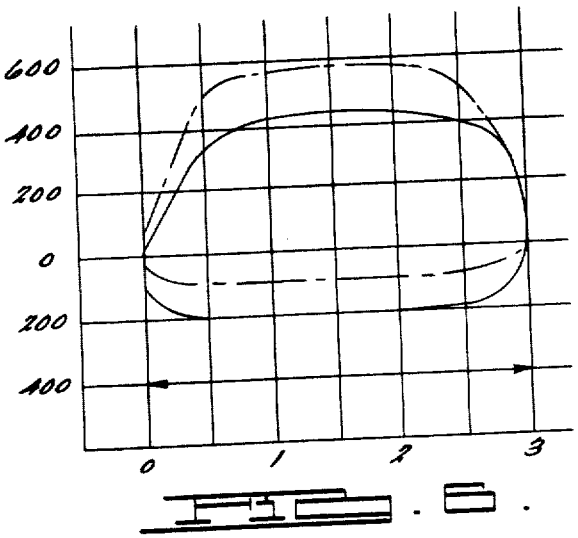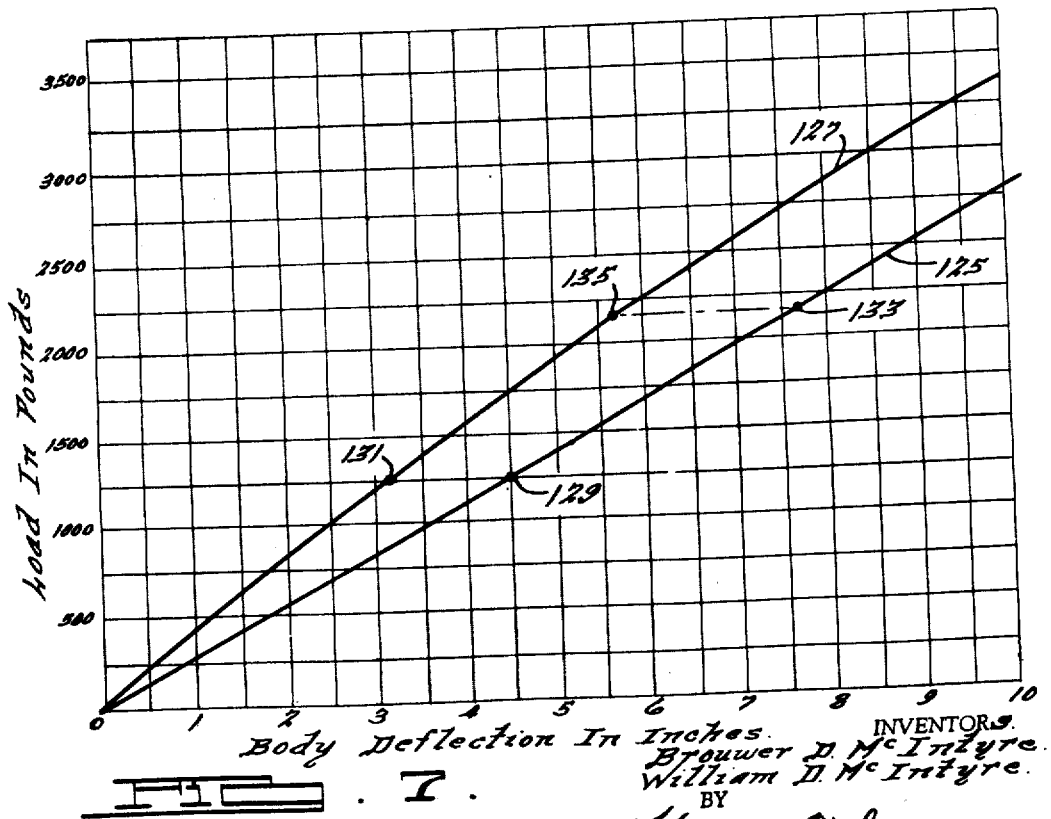

2,874,955
Patented Feb. 24, 1959

2,874,955

VEHICLE SUSPENSION SYSTEM

Brouwer D. McIntyre and William D. McIntyre, Monroe, Mich., assignors, by mesne assignments, to Monroe Auto Equipment Company, a corporation of Michigan Application June 11, 1957, Serial No. 665,001

7 Claims. (Cl. 267—8)

This invention relates generally to a vehicle suspension system and more particularly to a suspension system incorporating a main spring, an auxiliary spring and a hydraulic shock absorber wherein the auxiliary spring is carried by the shock absorber and wherein the shock absorber is calibrated relative to both the main and auxiliary springs so as to provide improved suspension characteristics when a vehicle is both lightly loaded and heavily loaded.

During the past ten years there has been a fairly consistent pattern of changes in automobile suspension systems which have created a need for added load carrying capacity in the rear suspension springs. Some of these changes include: lower spring rates used to reduce frequency of oscillation; reduced frame to axle clearance resulting from lowering of car height; decreased wheel diameters; increased engine torque causing more rear axle windup upon acceleration and increased car weights. Automobile suspension systems are generally designed and worked out by the automotive engineers on the basis of a vehicle load of one to three passengers. It is, however, well-known that in many instances, automobiles are heavily loaded in that many carry as many as six passengers in the front and rear seats and may carry a heavy load such as baggage, heavy merchandise or the like in the trunk, or in the case of a station wagon, in the rear deck of the vehicle. Furthermore, automobiles are used to carry sporting equipment; to pull trailers; carry salesman's samples; by weekend farmers to carry equipment, feed and the like. In all such events, a substantially increased load is carried in the rear portion of the vehicle, thus changing the center of gravity of the whole vehicle mass, and decreasing the oscillation rate of the rear springs, thereby upsetting the suspension system balance.

In present day automobiles, the clearance between the rear axle of the vehicle and the chassis frame has been reduced to as little as 6½ inches. This clearance is further reduced by the fact that the axle and the frame each carry rubber bumpers which may be between 2 and 3 inches in height and, therefore, there may be as little as 3½ inches of space between the rubber bumpers so that bottoming or engagement of the rubber bumpers can occur upon a relatively small amount of spring deflection. This is particularly true when the vehicle is heavily loaded and, therefore, if a heavily loaded vehicle is driven over road bumps or the like, a constant bottoming of the frame and the rear axle occurs, or in some instances, if the loading is sufficiently heavy, the frame is riding directly on the rear axle, thus eliminating to a large extent the suspension system. In addition, when the rear end of the vehicle is heavily loaded the rear end of the vehicle is disposed below the front end thereof, and the vehicle headlights' beam is thrown up into the air and vision to the rear of the vehicle is impaired. Still further actual road clearance has become a real problem, especially when going in or out of a steep driveway or when driving on country roads, and the need for more stability in turns at high speed has become more pronounced.

The seriousness of these problems has been recognized in the automobile industry as evidenced by the fact that many auxiliary or helper spring units have been developed and designed for use on vehicles. These helper springs have taken the form of coil springs, flat leaf type springs, air bags, etc., but it has been found that when such helper springs have been placed on a vehicle the suspension system balance which was designed into the vehicle is destroyed and the frequency of the suspension system quite often is increased substantially and a rough, jerky and unpleasant ride results, particularly when the vehicle is lightly loaded. In addition, many of such previously known helper springs have been difficult to install; have required the use of special fittings or brackets; have reduced the clearance space between the sprung and unsprung assemblies of the vehicle and have not been adaptable to different designs and makes of vehicles. Also, in many instances, such helper spring units have materially raised the rear end of the vehicle when the same is lightly loaded, thus adversely affecting the appearance of the vehicle, the position of the headlight beam and the over-all ride characteristics when the vehicle is lightly loaded.

It is, therefore, an object of this invention to provide a suspension system which incorporates an auxiliary spring and a hydraulic shock absorber which is calibrated with relationship to both the main and auxiliary suspension springs so as to overcome the aforementioned difficulties present both in modern automobile suspension systems and in suspension systems incorporating previously known helper or auxiliary spring arrangements.

It is a still further object of this invention to provide an auxiliary unit composed of a coil spring carried by a shock absorber which is adapted to be mounted on a vehicle in place of the conventional shock absorbers, which will automatically level a vehicle for both light and heavy loads and which will not upset the suspension system balance to any appreciable extent.

It is a still further object of this invention to provide an auxiliary unit of the aforementioned type which when mounted on a vehicle will provide, in conjunction with the main suspension springs, sufficient load carrying capacity to prevent bottoming even when the vehicle is heavily loaded and which will, under all conditions, provide a minimum increase in natural frequency of the designed suspension system to maintain passenger ride comfort under various vehicle load conditions.

It is a still further object of this invention to provide an auxiliary unit of the aforementioned type which when mounted in a vehicle suspension system will compensate for increase in spring rate to prevent upsetting of the suspension system and to maintain a substantially level ride under all load conditions, and which will not reduce the clearance or jounce space between the vehicle sprung and unsprung assemblies.

It is a still further object of this invention to provide a vehicle suspension system including the aforementioned auxiliary units which will increase vehicle stability on turns and which will reduce roll and sway of the vehicle sprung assembly on the unsprung assembly.

It is a still further object of this invention to provide an auxiliary unit of the aforementioned type which is quiet in operation, exceptionally durable and which may be easily and quickly installed in a vehicle in place of the conventional hydraulic shock absorbers.

It is a still further object of this invention to provide an auxiliary unit of the aforementioned type in which the coil spring and hydraulic shock absorber can be easily assembled or taken apart and in which means are provided to insure the shock absorber and coil spring being maintained in the proper relationship with respect to each other and in which rattles cannot occur because of metal to metal engagement of the shock absorber and coil spring.

These and other objects of this invention will become apparent from the following detailed description taken in conjunction with the accompanying drawings in which:

Figure 1 is a fragmentary side elevational view of the rear portion of an automotive vehicle, with portions broken away in section to illustrate the suspension system of this invention;

Fig. 2 is a rear elevational view of the suspension system of this invention as it is incorporated in the vehicle shown in Fig. 1;

Fig. 3 is an enlarged sectional view of the structure illustrated in Fig. 1 taken along the line 3—3 thereof and showing the components thereof in the compressed position;

Fig. 4 is a fragmentary sectional view of the structure illustrated in Fig. 3 taken along the line 4—4 thereof;

Fig. 5 is a sectional view of the structure illustrated in Fig. 3 taken along the line 5—5 thereof;

Fig. 6 is a graph illustrating the manner in which the shock absorber calibration of the unit of this invention compares with that of a standard shock absorber employed on a production vehicle; and Fig. 7 is a load deflection data graph illustrating deflection of the sprung portion of a vehicle with and without the auxiliary units of this invention incorporated as a part of the vehicle suspension system.

Referring now to the drawings and more particularly to Figs. 1 and 2, it will be seen that the rear portion of an automotive vehicle 9 is illustrated although it will be understood that this invention is equally applicable to station wagons, trucks and other types of devices including sprung and unsprung assemblies. The automobile 9 includes a sprung assembly 11 and an unsprung assembly 12. The sprung assembly includes, in the usual manner, the body 13, chassis frame 15 and other parts which are yieldably supported on the unsprung assembly through springs such as the illustrated rear leaf springs 17. The unsprung assembly includes the ground engaging wheels and tires 19, the rear axle 21 and the other parts on which the sprung assembly 11 is supported through the vehicle springs. It will be noted that only a rear portion of an automotive vehicle is illustrated, however, the auxiliary units of this invention may be applied to the front portion of a vehicle without departing from the scope of the invention. It will also be appreciated that while the springs 17, which are disposed adjacent each wheel 19, are illustrated as being of the leaf type, they could be of any suitable type such as coil, air, torsion bars, etc. without departing from the scope of this invention.

Practically all vehicles now manufactured and sold are equipped at the factory with hydraulic shock absorbers which dampen the rebound action of the springs and which also impart compression resistance to body and spring deflection and which aid in eliminating wheel hop so as to keep the ground engaging wheels on the road. These shock absorbers are connected between the sprung and unsprung assemblies by suitable pins or brackets and the auxiliary units, illustrated generally at 23, are adapted to be connected to the connections already on the vehicles sprung and unsprung assemblies for supporting the conventional original equipment shock absorbers. Thus, in the illustrated embodiment, a plate or bracket portion 24 is provided on the bracket assembly 25 for each spring 17, and is suitably apertured at 27 to receive the lower stem end 29 of a shock absorber forming a part of the auxiliary unit 23. A nut 31 is threaded on the lower end of the stem 29 and is spaced from the plate 24 by washer 33 and a rubber bushing 35. A pin 37 is provided on the chassis frame 15 adjacent each of the wheels 19 to which the upper end of a conventional end of a shock absorber is normally connected and in the structure of this invention, the upper end of each auxiliary unit 23 has a loop 39 which fits over the pin 37 and is insulated therefrom by a rubber bushing 41. A suitable nut or other means may be provided for locking the upper end of each unit on its pin 37. It will be noted that the pins 37 are disposed laterally inwardly from the bracket portions 24 to which the lower ends of the units 23 are connected so that the units 23 extend angularly upwardly and inwardly from the bracket plates 24 for reasons which will become more apparent hereinafter.

Each of the units 23 includes a direct acting tubular hydraulic shock absorber 43 over which is sleeved a coil spring 45. For most present day automobiles, the spring 45 has a rate of between 40 and 60 pounds. The shock absorber includes an outer reserve tube 47, the lower end of which is closed by a closure member 49 to which the stem 29 is rigidly connected. The upper end of the reserve tube 47 is closed by means of an end cap 51 which is centrally apertured at 53 to slidably receive a piston rod 55 which projects upwardly therebeyond, and to the upper end of which the loop 39 is rigidly connected. An annular shoulder or projection 57 is formed in the wall of the reserve tube 47 adjacent to, but above the lower end thereof. An annular spring support member 59 is sleeved over the upper end of the shock absorber and abuts the annular shoulder 57 on the reserve tube. The support member 59 is suitably shaped so that it may be inserted over the loop 39 and over the reserve tube into engagement with the shoulder or abutment 57. An elongated tubular spacer 61 is sleeved downwardly over the shock absorber so that the lower end thereof abuts against the upper edge of the support member 59. The spacer 61 is preferably formed or molded from a rubber like material and acts to retain the coil spring 45 in a concentric relationship with the reserve tube 47 as will hereinafter appear. At the same time the spacer acts to prevent metal to metal contact between the spring and the periphery of the reserve tube. It is, however, important that as much air as possible be permitted to circulate around the shock absorber to keep the same cool during operation and it is also desirable to reduce any frictional engagement between the spacer 61 and the spring 45. Therefore, the spacer is molded with a plurality of axially extending circumferentially spaced grooves or passageways 63 and 65 in the inner and outer faces thereof.

The coil spring 45 is sleeved over the shock absorber and spacer 61 so that the lower end thereof engages and is supported by the spring support 59 which in turn is supported on the shock absorber reserve tube 47. In order to support and connect the upper end of the spring 45 with the piston rod 55, a hat shaped support member 67 has its inner periphery disposed in a groove 69 in the piston rod adjacent the upper end thereof with its lower or outer periphery engaged in an annular notch or groove 71 formed in the upper end of a split collar or ring 73. The collar or ring is split into halves and has a depending annular flange 75 on the lower end thereof which is adapted to engage the inner diameter of the coil spring, at the upper end thereof, and the collar has a horizontally disposed shoulder 77 immediately above the flange 75 which engages the top of the coil spring 45. Therefore, after the spring 45 has been sleeved over the shock absorber so that the lower end thereof engages the lower spring support 59, the split ring halves 73 are inserted into engagement with the upper end of the spring 45 and with the support 67. This is done by compressing the spring slightly and slipping two halves of the split ring into position separately. When both rings are in position, the spring 45 is thereby unitarily assembled with the shock absorber 43 so that an auxiliary unit is provided which can be mounted on a vehicle as previously described.

If for any reason the shock absorber or the spring should become damaged or inoperative, the spring 45 and the spacer sleeve 61 can be disassembled from the shock absorber 43 by compressing downwardly on the split ring 73 to move the notch 71 below the support 67 and then slipping each of the split ring halves out of engagement therewith. The spring 45 and spacer can thereafter be lifted upwardly off of the shock absorber and the lower spring support 51 can be lifted from the shock absorber thus permitting easy disassembly.

Insofar as the internal construction of the shock absorber is concerned, one particular construction is illustrated and will be described, but it will be obvious to those skilled in the art that various types of tubular, direct acting shock absorber constructions can be incorporated without departing from the scope of this invention so long as the shock absorber is calibrated with respect to both the auxiliary spring 45 and the main suspension spring 17, as will hereinafter appear. The particular shock absorber illustrated has an inner tubular member 79 which is normally referred to as a pressure cylinder. It is concentrically disposed with respect to the reserve tube 47 and has its upper end closed by an apertured rod guide 81 through which the piston rod 55 extends. A seal assembly 82 is disposed between the upper end of the rod guide 81 and the reserve tube end cap 51 so as to prevent the leakage of hydraulic fluid from the upper end of the pressure cylinder. It will, of course, be understood that the pressure cylinder 79 and a portion of the reservoir, between the pressure cylinder and the reserve tube are filled with hydraulic liquid. The lower end of the pressure cylinder is closed by means of a base valve assembly 83. The base valve assembly 83 includes a valve body 85 which is provided with grooves on its underside so as to communicate the space beneath the valve body 85 with the space between the reserve tube 47 and the pressure cylinder 79 so that hydraulic fluid can flow between the pressure cylinder and the reservoir formed between the reserve tube and the pressure cylinder. A spring type baffle 86 is provided in the reservoir to reduce aeration in the hydraulic liquid in a known manner.

In the base valve assembly illustrated, the valve body 85 has a large central aperture 87, the upper end of which is closed by a disk 89 through which a pin 91 extends. A light spring 93 normally retains the pin 91 and the disk 89 in a down position in engagement with a valve seat around the opening 87 so as to close off the upper end of the opening 87 as illustrated and described in the U. S. Patent No. 2,616,711. As described in said patent, the pin 91 is apertured to permit fluid to flow from the pressure cylinder downwardly therethrough and this aperture is closed by means of a valve 95 which is held in engagement with its seat by means of the small coil spring 97, the lower end of which engages a spring support 99 supported on the lower end of the pin 91.

The lower end of the piston rod 55 is connected with a piston 101 which has an inner set of circumferentially spaced passages 103 and an outer set of circumferentially spaced passages 105 as well as a central aperture 107 through which the reduced and threaded lower end of the piston rod extends. The upper ends of the passages 105 are closed by means of a disk 109 which is yieldably held in engagement with a valve seat on the top of the piston by means of a spring 111, the inner peripheral portion of which engages an annular flange or a support washer 113 which is disposed between the top of the piston 101 and the upper end of the reduced piston rod portion. The lower ends of the piston passages 103 are closed by valve disks 114 which are yieldably held in engagement with the valve seat 115 by means of a coil spring 117 which in turn is supported and loaded by means of a nut 119 threaded on the lower end of the piston rod 55.

When the piston is moved upwardly in the pressure cylinder, on the rebound stroke, the pressure of the hydraulic liquid in the pressure cylinder above the piston will increase until the valve disks 114 are moved away from valve seat 115 and the liquid will flow through piston passages 103 into the lower portion of the pressure cylinder. The liquid pressure at which the valve disks will be actuated depends on the strength of the spring 117 and the number of valve disks 114 which are employed. Because the piston rod 55 occupies a portion of the volume of the pressure cylinder above the piston, it is necessary that the lower portion of the pressure cylinder be replenished with liquid during the rebound stroke. This is accomplished by the flow of liquid from the reservoir through the aperture 87 in the base valve body 85 and past the valve plate 89. As the valve plate 89 is held on its seat only by the very light spring 93, the pressure differential on opposite sides of the base valve will be sufficient to actuate the valve plate 89 so that the pressure cylinder remains filled with liquid. When the shock absorber piston 101 moves downwardly in the pressure cylinder, on the compression stroke, liquid in the pressure cylinder, below the piston, will flow upwardly through piston passages 105, when sufficient pressure has been built up to move valve disk 109 away from the top of the piston body, against the action of the spring 111. The portion of the pressure cylinder 79 above the piston 101 cannot accommodate all of the liquid displaced from the lower portion of the pressure cylinder, because of the presence of the piston rod 55. Therefore, as the piston moves downwardly in the pressure cylinder, liquid pressure will build up and will move the base valve member 95 downwardly off of its seat, against the action of the spring 97, and the liquid will flow into the reservoir formed between the pressure cylinder and the reserve tube 47. The compression resistance of a shock absorber, of course, depends upon the loading of the valve disks in the piston and base valve assembly and by changing the springs or valve disk arrangements the compression resistance of the shock absorber can be varied. Still further, in certain instances, the sizes of the openings or passageways in the piston and base valve assemblies may be varied to provide certain orifice or velocity control in the shock absorber so that the shock absorber resistance can be calibrated in terms of both pressure and velocity control.

It is normal practice to calibrate shock absorbers with respect to the main suspension springs on an automotive vehicle in order to provide a desired suspension system for such vehicle. For example, when a new model of an automobile is brought out, engineers determine the proper valving for the shock absorbers in accordance with the springs which the automotive manufacturer desires to use on the vehicle, and, of course, in accordance with the weight of the vehicle, etc. The shock absorber valving is calibrated so that the shock absorbers will effectively dampen the rebound of the springs and so that they will have sufficient compression resistance to eliminate wheel hop while at the same time, the resistance is not excessive so as to impair the soft, comfortable ride desired by the vehicle manufacturer. At the same time a certain amount of compression control or resistance in the shock absorbers is desirable in order that the same will be properly loaded to reduce any tendency for voids or air bubbles to form in the hydraulic liquid, during the operation of the shock absorber. In one particular present day automobile, the rebound and compression valving of the shock absorber is calibrated relative to the vehicle springs to provide the resistance illustrated in solid lines in the graph of Fig. 6 wherein it will be noted that at a given speed of movement of the piston relative to the pressure cylinder, based on a 3 inch piston stroke, the maximum rebound resistance is approximately 425 pounds. For this particular car this is the amount of resistance found necessary to properly control the rebound action of the vehicle sprung assembly. At the same time, the compression valving of the production shock absorber is such as to provide a maximum of approximately 200 pounds of compression resistance. This is found to be desirable with the particular vehicle suspension system arrangement in order to give the desired compressive control and the best possible ride. It was, however, found that this same shock absorber valving was not satisfactory to produce a satisfactory vehicle ride under all load conditions when 60 pound rate coil springs were added to the standard suspension system, such as occurs when the auxiliary units of this invention are installed on a vehicle adjacent each of the rear wheels as illustrated in the drawings. It was, therefore, found to be necessary to calibrate the shock absorbers of the units of this invention with respect to both the main springs and the auxiliary springs and this entailed increasing the rebound control of the shock absorber in order to compensate for the increase in spring rate and prevent upset of the balance between the front and rear end of the car and maintain a level ride, and likewise it was necessary to reduce the compression resistance of the shock absorber in order to effect a minimum increase in the natural frequency of the suspension system. After considerable test work on this particular vehicle, with the auxiliary springs employed, it was found that the valving in the shock absorber should be such that the maximum rebound resistance is approximately 575 pounds as can be seen in dot-dash lines in Fig. 6 and the maximum compression resistance is approximately 100 pounds. The calibration of the shock absorbers is, therefore, with relation to both the auxiliary springs and the main springs of the vehicle in order to provide the proper control on both rebound and compression strokes under various load conditions. With this arrangement the vehicle was found to ride very comfortably when it was lightly loaded and was found to have sufficient resistance to properly support the sprung portion of the vehicle even under heavy loads so as to keep the headlight beams on the road and so as to provide increased clearance space between the sprung and unsprung portions even under heavy load. Applicants have tested various types of vehicle helper arrangements, which are now on the market, and compared them with the device of this invention and it was found that applicants' device is far superior with respect to providing a minimum increase in the natural frequency of a vehicle suspension system, a minimum reduction in clearance or jounce space, increased lateral stability on turns and reduction of body roll. It was also found that applicants' device was the only one compensating for increased spring rate and preventing upset of the balance between the front and rear of a vehicle to maintain a level ride.

Referring now to the graph illustrated in Fig. 7 it will be noted that the horizontal ordinate or abscissa reflects deflection in inches of a vehicle sprung assembly while the vertical ordinate reflects load in pounds of the sprung assembly. The graph line or curve 125 represents a standard automotive vehicle without the auxiliary units of the invention, and the graph line or curve 127 represents the same vehicle and suspension with the auxiliary units of this invention added or incorporated as a part of the suspension system. For the particular vehicle in which this test data was accumulated, the load of the sprung assembly with no passengers and with the rear trunk empty is approximately 1250 pounds as illustrated by the dots 129 and 131 in Fig. 7. It will be noted that with such a load the deflection of the standard vehicle sprung assembly, without the unit of this invention, is approximately 4½ inches while with the auxiliary units of this invention incorporated, as illustrated and described, the deflection is approximately 3¼ inches. Thus, when the vehicle is standing unloaded, the rear end of the sprung assembly will be approximately 1¼ inches higher when the devices of this invention are incorporated in the rear portion of the vehicle suspension than when they are not used. This is a relatively small and negligible change in the height of the sprung assembly and will not adversely affect the appearance of the vehicle, the headlight beam or any of the other desirable vehicle characteristics. When the vehicle is loaded with four passengers plus 500 pounds of material in the trunk, the load is approximately 2200 pounds and the deflection of the sprung assembly under these conditions is illustrated by the dots 133 and 135 in Fig. 7 wherein it will be noted that the deflection of the sprung assembly of the vehicle without the auxiliary units is approximately 7¾ inches while with the devices of this invention incorporated in the suspension system, the deflection is only about 5.7 inches. Therefore, the deflection under load is about 2 inches more in the standard vehicle than in the vehicle having the devices of this invention incorporated therein. This is extremely important in view of the fact that when the standard vehicle is so loaded there is slightly less than 1 inch of clearance between the axle bumper and the frame bumper while when the devices of this invention are employed there is approximately 3 inches of clearance between the bumper and the axle. Thus, even at full loads, the deflection of the vehicle sprung assembly is substantially reduced when the devices of this invention are incorporated in the suspension system, thus keeping the headlight beams on the road and providing increased clearance space between the axle and the chassis frame so that the tendency for the suspension system to bottom will be substantially reduced. This is accomplished without adding harshness to the riding characteristics of the vehicle even when the same is lightly loaded and so far as applicants know, this is the first time that auxiliary units have been provided which will substantially maintain the proper level of the car under various load conditions and wherein proper suspension system balance is maintained under all load conditions. Still further, because of the "sea leg" or angular mounting of the auxiliary units, as best seen in Fig. 2, the lateral stability of the vehicle on turns is increased and body roll is reduced. It has also been found that the auxiliary units of this invention can be installed on a car much more rapidly than any known helper spring devices. In addition to all of the aforementioned advantages, exhaustive tests of cars incorporating the auxiliary units of this invention have shown that vehicles so equipped have a reduction in main suspension spring breakage, tire wear is improved because of better steering geometry and reduced tendency for side thrust and cornering, brake and clutch operation is improved due to more stable rear springing, and a better seating angle is provided for passengers in both front and rear seats.

What is claimed is:

1. In a suspension device, a hydraulic direct acting tubular shock absorber having relatively movable telescopic parts, a coil spring disposed substantially concentrically with respect to said shock absorber, means on one of said relatively movable shock absorber parts engaging and supporting one end of said coil spring, means on the other of said relatively movable shock absorber parts engaging and supporting the opposite end of said coil spring, an elongated tubular spacer sleeved over said shock absorber for maintaining said coil spring in a substantially concentric relationship with respect to said shock absorber, said sleeve having passageways therein permitting a flow of air between said sleeve and said shock absorber to permit said shock absorber to remain cool in operation.

2. In a suspension device, a hydraulic direct acting tubular shock absorber including an elongated tubular pressure cylinder, a bore fitting ported piston slidably disposed in said pressure cylinder, valve means associated with said piston to control the flow of hydraulic fluid from one side of said piston to the other side thereof, a reserve tube concentrically surrounding said cylinder in spaced relation thereto, valve means closing one end of said pressure cylinder and communicating said pressure cylinder and said reserve tube, means closing the end of said reserve tube adjacent said pressure cylinder valve means, a piston rod connected with said piston and projecting beyond the opposite ends of said tubes, closure means closing said opposite tube ends and slidably receiving said piston rod, means on said one end of said reserve tube and on the projecting end of said piston rod adapted to be connected with relatively movable assemblies, a coil spring sleeved over said reserve tube, an annular shoulder formed in the wall of said reserve tube adjacent said one end, a support member sleeved over said reserve tube and engaging said annular shoulder and one end of said spring so as to support said one end of said spring on said reserve tube, a split ring like support engaging the opposite end of said spring and removably connected with said piston rod adjacent the projecting end thereof so as to support the opposite end of said spring on said piston rod, an elongated tubular spacer sleeved over said reserve tube and disposed between said reserve tube and said coil spring so as to maintain said coil spring in spaced relationship to said reserve tube, said sleeve having passageways therein to permit the circulation of air between at least portions of said sleeve and said reserve tube so as to aid in maintaining said shock absorber in a relatively cool condition during operation.

3. In a suspension device, a hydraulic direct acting tubular shock absorber having relatively movable telescopic parts, a coil spring sleeved over said shock absorber, the inside diameter of which is larger than the outside diameter of said shock absorber, an elongated tubular spacer sleeved over said shock absorber and disposed in the space between said shock absorber and said coil spring, said spacer having a plurality of circumferentially spaced axially extending passageways formed in both the inner wall portion thereof and the outer wall portion thereof, whereby said spacer maintains said shock absorber and coil spring in a spaced relationship.

4. In a suspension device, a hydraulic direct acting tubular shock absorber including an elongated tubular pressure cylinder, a bore fitting ported piston slidably disposed in said pressure cylinder, valve means associated with said piston to control the flow of hydraulic fluid from one side of said piston to the other side thereof, a reserve tube concentrically surrounding said cylinder in spaced relation thereto, valve means closing one end of said pressure cylinder and communicating said pressure cylinder and said reserve tube, means closing the end of said reserve tube adjacent said pressure cylinder valve means, a piston rod connected with said piston and projecting beyond the opposite ends of said tubes, closure means closing said opposite tube ends and slidably receiving said piston rod, means on said one end of said reserve tube and on the projecting end of said piston rod adapted to be connected with relatively movable assemblies, a coil spring sleeved over said reserve tube, means carried by said reserve tube and supporting one end of said spring on said reserve tube, means carried by said piston rod adjacent the projecting end thereof and supporting the opposite end of said spring on said piston rod, and an elongated, nonmetallic, tubular spacer sleeve fitted over said reserve tube and disposed between said reserve tube and said coil spring and resisting lateral movement of the coil spring so as to maintain said coil spring in spaced relationship to said reserve tube.

5. In a suspension device, a hydraulic direct acting tubular shock absorber including an elongated tubular pressure cylinder, a bore fitting ported piston slidably disposed in said pressure cylinder, valve means associated with said piston to control the flow of hydraulic fluid from one side of said piston to the other side thereof, a reserve tube concentrically surrounding said cylinder in spaced relation thereto, valve means closing one end of said pressure cylinder and communicating said pressure cylinder and said reserve tube, means closing the end of said reserve tube adjacent said pressure cylinder valve means, a piston rod connected with said piston and projecting beyond the opposite ends of said tubes, closure means closing said opposite tube ends and slidably receiving said piston rod, means on said one end of said reserve tube and on the projecting end of said piston rod adapted to be connected with relatively movable assemblies, a coil spring sleeved over said reserve tube, a support member carried by said reserve tube and supporting one end of said spring, means engaging the opposite end of said spring and removably connected with said piston rod adjacent the projecting end thereof so as to support the opposite end of said spring on said piston rod, an elongated, nonmetallic, tubular spacer sleeve fitted over said reserve tube and disposed between said reserve tube and said coil spring and resisting lateral movement of the coil spring so as to maintain said coil spring in spaced relationship to said reserve tube.

6. In an automotive vehicle suspension system, the combination including a sprung assembly and an unsprung assembly, said unsprung assembly comprising a rear axle and a pair of laterally spaced ground engaging wheels mounted on said axle, a main suspension spring disposed adjacent each said wheel and connected with said sprung and unsprung assemblies so as to yieldably support said sprung assembly on said unsprung assembly, an auxiliary coil spring disposed between said sprung and unsprung assemblies, a hydraulic direct acting tubular shock absorber extending through each coil spring in substantially concentric relationship with respect thereto, each of said shock absorbers including relatively movable telescopic parts, one of said parts of each of said shock absorbers being connected to said sprung assembly and the other of said parts of each of said shock absorbers being connected to said unsprung assembly adjacent one of said main suspension springs, means carried by each of said shock absorber parts engaging and supporting the opposite ends of the adjacent coil spring so that movement of said sprung and unsprung assemblies toward each other results in substantially simultaneous compression of all of said springs and telescoping of said shock absorbers and movement of said sprung and unsprung assemblies away from each other results in substantially simultaneous expansion of all of said springs and extension of said shock absorbers, valve means in each of said shock absorbers providing controlled resistance to the flow of hydraulic fluid in said shock absorbers and to the telescoping and extension of said shock absorber parts, said valve means comprising means defining a plurality of valve openings, a plurality of movable valve members controlling the flow of hydraulic fluid through said valve openings, and resilient means controlling the movement of said valve members relative to the valve openings, said valve openings, said valve members and said resilient means being selected with relation to both said main suspension springs and said auxiliary springs so as to effectively dampen the extension of all of said springs and so as to add a minimum of resistance to compression of all of said springs while still permitting effective operation of said shock absorbers under road conditions.

7. In a rear suspension system for an automotive vehicle, the combination comprising a sprung assembly and an unsprung assembly, said unsprung assembly comprising a rear axle and a pair of laterally spaced ground engaging wheels mounted on said axle, a main suspension spring disposed adjacent each said wheel and connected with said sprung and unsprung assemblies so as to act in a generally vertical direction to yieldably support said sprung assembly on said unsprung assembly for relative vertical movement, a pair of angularly extending auxiliary coil springs disposed between said sprung and unsprung assemblies, an angularly disposed hydraulic direct acting tubular shock absorber extending through each of said coil springs, each of said shock absorbers including relatively movable telescopic parts, means on each of said shock absorber parts engaging and supporting the opposite ends of the adjacent coil spring so that telescoping and extension of said shock absorber parts and compression and extension of said coil springs occures simultaneously, one of said parts of each of said shock absorbers being connected with said rear axle of said unsprung assembly adjacent one of said main suspension springs, the other part of each of said shock absorbers being connected with said sprung assembly laterally inwardly of the connection to said unsprung assembly so that each said shock absorber and the adjacent coil spring extends angularly between said sprung and unsprung assemblies so as to provide a lateral component to resist lateral sway of said sprung assembly relative to said unsprung assembly while simultaneously adding a vertical component to the resistance to vertical movement provided by said main springs between said sprung and unsprung assemblies.

References Cited in the file of this patent

UNITED STATES PATENTS

| | | |
|---|---|---|
| 1,471,474 | Dahlstrom | Oct. 23, 1923 |
| 2,092,259 | Padgett | Sept. 7, 1937 |
| 2,158,488 | Pribil | May 16, 1939 |
| 2,452,108 | Dath | Oct. 26, 1948 |
| 2,624,592 | MacPherson | Jan. 6, 1953 |
| 2,640,693 | Magrum | June 2, 1953 |
| 2,653,681 | McIntyre | Sept. 29, 1953 |
| 2,733,058 | Reese | Jan. 31, 1956 |
| 2,756,045 | Savory | July 24, 1956 |

FOREIGN PATENTS

| | | |
|---|---|---|
| 466,870 | Italy | Nov. 20, 1951 |
| 1,044,393 | France | June 17, 1953 |
| 1,059,988 | France | Nov. 18, 1953 |
| 719,661 | Great Britain | Dec. 8, 1954 |

Disclaimer 2,874,955.—*Brouwer D. McIntyre* and *William D. McIntyre*, Monroe, Mich. VEHICLE SUSPENSION SYSTEM. Patent dated Feb. 24, 1959. Disclaimer filed Aug. 28, 1959, by the assignee, *Monroe Auto Equipment Company*.

Hereby enters this disclaimer to claim 7 of said patent.

[*Official Gazette October 6, 1959.*]

Notice of Adverse Decision in Interference

In Interference No. 90,376, involving Patent No. 2,874,955, B. D. McIntyre and W. D. McIntyre, Vehicle suspension system, final judgment adverse to the patentees was rendered September 2, 1959, as to claim 7.

[*Official Gazette October 13, 1959.*]